(12) United States Patent
Shimura

(10) Patent No.: US 10,997,574 B2
(45) Date of Patent: May 4, 2021

(54) SELF-SERVICE CHECKOUT APPARATUS AND METHOD THEREOF

(71) Applicant: TOSHIBA TEC KABUSHIKI KAISHA, Tokyo (JP)

(72) Inventor: Takahiro Shimura, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 158 days.

(21) Appl. No.: 16/266,348

(22) Filed: Feb. 4, 2019

(65) Prior Publication Data
US 2019/0251540 A1    Aug. 15, 2019

(30) Foreign Application Priority Data
Feb. 13, 2018 (JP) .............................. JP2018-022671

(51) Int. Cl.
*G06Q 20/20* (2012.01)
*G06K 7/10* (2006.01)
*G06K 7/14* (2006.01)
*G07G 1/00* (2006.01)

(52) U.S. Cl.
CPC ....... *G06Q 20/208* (2013.01); *G06K 7/10554* (2013.01); *G06K 7/1413* (2013.01); *G06Q 20/20* (2013.01); *G07G 1/0036* (2013.01)

(58) Field of Classification Search
CPC ........ G06Q 20/208; G06Q 20/20; G06K 7/10; G06K 7/14; G06K 7/1413; G06K 7/10554; G07G 1/0036
See application file for complete search history.

(56) References Cited

U.S. PATENT DOCUMENTS

| | | | | |
|---|---|---|---|---|
| 6,189,790 B1 * | 2/2001 | Walter | ............... | G07G 1/0036 186/61 |
| 6,386,450 B1 * | 5/2002 | Ogasawara | ........ | G06K 17/0022 235/383 |
| 6,598,790 B1 * | 7/2003 | Horst | .................. | G07G 1/0036 235/375 |
| 7,720,711 B2 * | 5/2010 | Taylor | ................... | G06Q 20/20 705/16 |

(Continued)

FOREIGN PATENT DOCUMENTS

JP    2012-048319 A    3/2012

*Primary Examiner* — Andrew Joseph Rudy
(74) *Attorney, Agent, or Firm* — Kim & Stewart LLP (57) ABSTRACT

A self-service checkout apparatus includes dispensers each configured to dispense an article, first sensors each configured to detect a presence of the article in the corresponding dispenser, first indicators each configured to indicate that the presence of the article in the corresponding dispenser, a second sensor configured to detect whether a user is present, and a processor configured to, when one or more articles are detected by the first sensors and the user is detected by the second sensor, perform first notification using the respective one or more of the first indicators, and when one or more articles are detected by the first sensors and the user is not detected by the second sensor, perform second notification according to a priority order predetermined for each article, using at least one of a second indicator of the self-service checkout apparatus and a third indicator of another apparatus.

20 Claims, 7 Drawing Sheets

(56) References Cited

U.S. PATENT DOCUMENTS

| | | | | |
|---|---|---|---|---|
| 8,210,335 B2 * | 7/2012 | Chang | .................... | G07D 7/12 |
| | | | | 194/206 |
| 9,842,345 B2 * | 12/2017 | Ariff | ................... | G06Q 20/042 |
| 10,152,615 B2 * | 12/2018 | Mitchell | ............. | G07F 19/2055 |
| 10,643,192 B2 * | 5/2020 | Bryant | ................ | G06Q 20/341 |

* cited by examiner

| DISPENSER | CARD DISPENSER | BILL DISPENSER | COIN DISPENSER | RECEIPT DISPENSER | ... |
|---|---|---|---|---|---|
| PRIORITY ORDER | 1 | 2 | 3 | 4 | ... |
| NOTIFICATION METHOD | ATTENDANT NOTIFICATION/SCREEN | ATTENDANT NOTIFICATION/SCREEN | SCREEN | NONE | ... |

# SELF-SERVICE CHECKOUT APPARATUS AND METHOD THEREOF

CROSS-REFERENCE TO RELATED APPLICATION

This application is based upon and claims the benefit of priority from Japanese Patent Application No. 2018-022671, filed on Feb. 13, 2018, the entire contents of which are incorporated herein by reference.

FIELD

Embodiments described herein relate generally to a self-service checkout apparatus and a method thereof.

BACKGROUND

In the related art, a self-service checkout POS terminal and a semi-self-service checkout POS terminal are known as a checkout device that executes settlement processing on a commodity to be sold by a customer's operation. The self-service checkout POS terminal is a checkout device that executes registration processing for registering the commodity to be sold and settlement processing of the commodity registered by the registration processing by the customer's operation. The semi-self-service checkout POS terminal is a checkout device that executes the settlement processing of the commodity to be sold by the customer's operation.

Meanwhile, the customer sometimes forgets to collect an article, such as a credit card, a receipt, change, and the like, dispensed from the checkout device. A technology for preventing such an article from having been left behind in the device is known in the related art.

However, in the related art, a technology for preventing a plurality of articles from having been left behind in the checkout device is not disclosed. Importance of the articles may be different (e.g., a credit card or a bill versus a receipt), and thus it is not enough to issue the same notification for different kinds of articles. Accordingly, a technology for appropriate notification depending on the importance of the articles is desired.

DETAILED DESCRIPTION

An embodiment provides a self-service checkout device and a method that can give notification according to importance of a plurality of articles in a case where a customer forgets to collect the articles.

According to one embodiment, there is provided a self-service checkout apparatus including a plurality of dispensers each configured to dispense an article, a plurality of first sensors each configured to detect a presence of the article in the corresponding dispenser, a plurality of first indicators each configured to indicate that the presence of the article in the corresponding dispenser, a second sensor configured to detect whether a user is present at the self-service checkout apparatus, and a processor. The processor is configured to, when one or more articles are detected by the first sensors and the user is detected by the second sensor, perform first notification using the respective one or more of the first indicators, and when one or more articles are detected by the first sensors and the user is not detected by the second sensor, perform second notification according to a priority order predetermined for each article, using at least one of a second indicator of the self-service checkout apparatus and a third indicator of another apparatus.

In the following, an embodiment of a checkout device and an method thereof will be described in detail with reference to the accompanying drawings. The embodiment described in the following is an embodiment of the checkout device and its method, and the configuration, specifications, and the like thereof are not limited thereto. The checkout device and the method of the embodiment are examples of application to a self-service checkout POS terminal.

Figure 1:
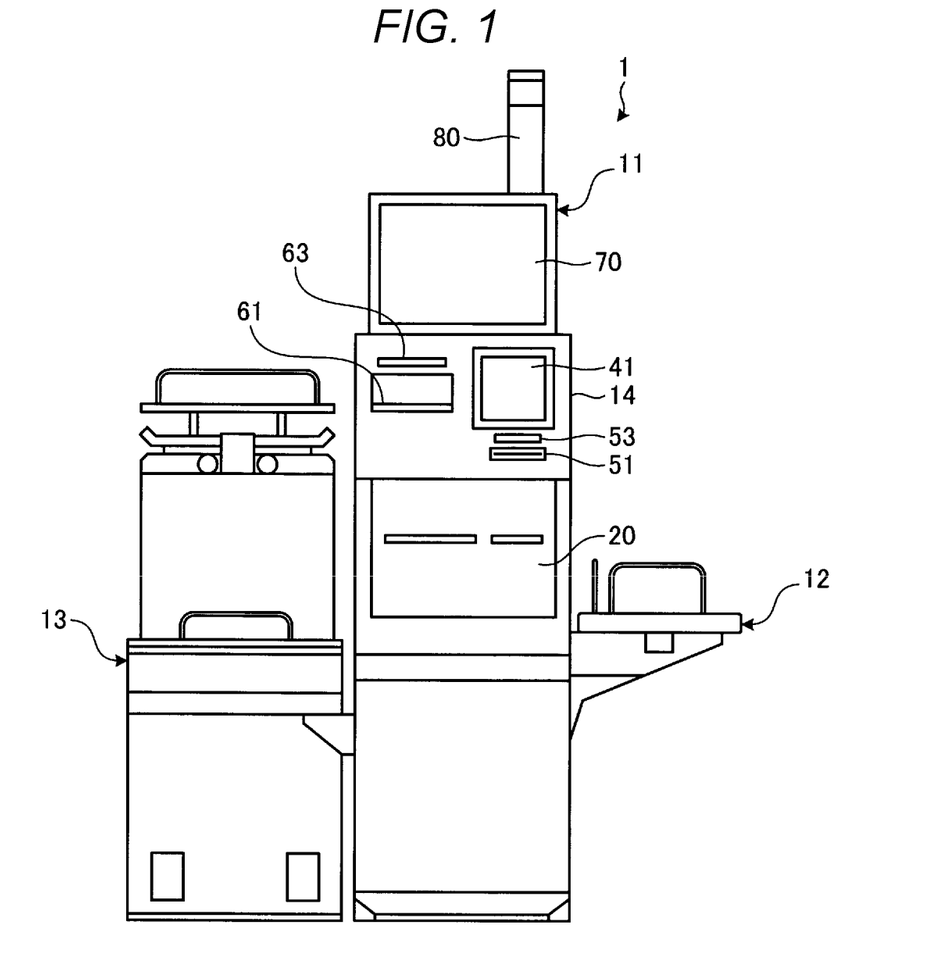
FIG. 1 is a front view illustrating an appearance of a self-service checkout POS terminal according to an embodiment.
Figure 2:
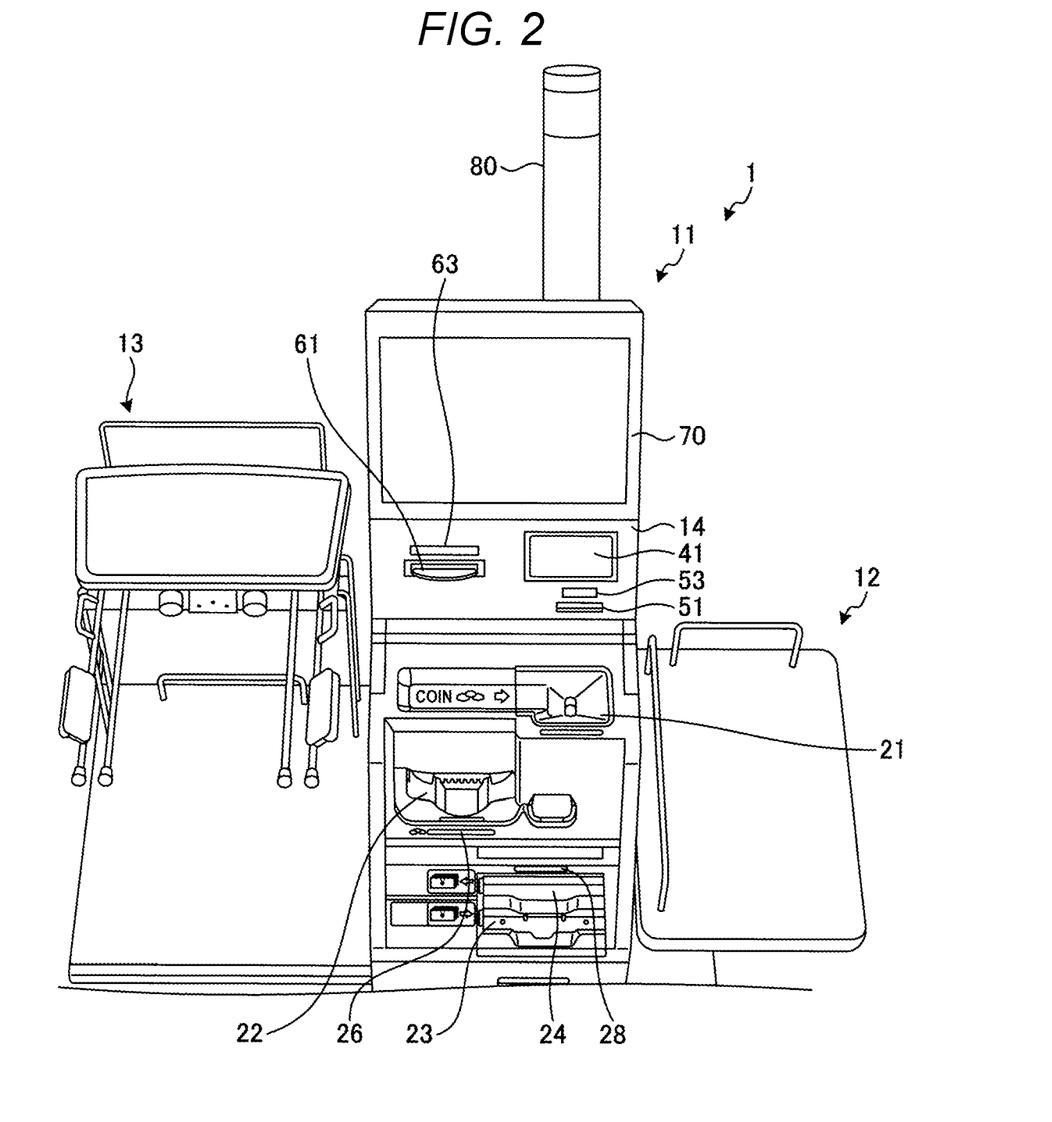
FIG. 2 is a perspective view illustrating an appearance in a state in which the self-service checkout POS terminal is viewed from above.

FIG. 1 is a front view illustrating an appearance of a self-service checkout POS terminal 1 according an embodiment. FIG. 2 is a perspective view illustrating an appearance in a state in which the self-service checkout POS terminal 1 is viewed from above. The self-service checkout POS terminal 1 is a checkout device that executes registration processing for registering the commodity to be sold and checkout processing for the commodity registered by the registration processing by a customer's operation.

The self-service checkout POS terminal 1 includes a main body 11, a basket table 12, and a bag table 13. The main body 11 includes a deposit and withdrawal unit 20 in the central portion. The main body 11 includes a storage unit 14 in which various devices such as a scanner 40 (see FIG. 3), a card reader 50 (see FIG. 3), and a printer 60 (see FIG. 3) are stored, above the deposit and withdrawal unit 20. The main body 11 includes a display 70 above the storage unit 14. The main body 11 includes an indicator lamp 80 behind the display 70.

The basket table 12 is a storage stand on which a basket is placed in registration processing. The bag table 13 is a storage stand which can be hooked with a shopping bag open. The registered commodity is put in the shopping bag.

The deposit and withdrawal unit 20 includes a coin input unit 21, a coin dispenser 22, a bill input unit 23, and a bill dispenser 24. The coin input unit 21 has an input port for receiving input of coins paid by a customer. The coin dispenser 22 has a receiving tray for receiving coins discharged from the deposit and withdrawal unit 20 such as change. The bill input unit 23 has an input port for receiving input of bills paid by customers. The bill dispenser 24 has a discharge port for bills discharged from the deposit and withdrawal unit 20 such as change.

Further, the self-service checkout POS terminal 1 includes a coin sensor 25 (see FIG. 3), a coin light emitting diode (LED) 26, a bill sensor 27 (see FIG. 3), and a bill LED 28. The coin sensor 25 is a sensor for detecting a coin on the receiving tray of the coin dispenser 22. For example, the coin sensor 25 is a magnetic sensor that detects the coin according to a magnetic state of the coin dispenser 22. The coin LED 26 is an LED that flickers when a coin is present in the coin dispenser 22. The bill sensor 27 is a sensor for detecting a bill in the discharge port of the bill dispenser 24. For example, the bill sensor 27 is a photo-sensor that detects a bill according to whether or not light is received without being interrupted by a bill in the bill dispenser 24. The bill LED 28 is an LED flickering when a bill is present in the discharge port of the bill dispenser 24.

The storage unit 14 includes a reading window 41, a card dispenser 51, and a receipt dispenser 61 on the front. The reading window 41 is formed of a plate that can transmit light. The reading window 41 is a window through which light is transmitted outside the storage unit 14 in a case where scanner 40 stored in the storage unit 14 reads a code symbol or the like. The card dispenser 51 has an insertion port into which a card such as a credit card or the like is inserted into the card reader 50 stored inside the storage unit 14 and a discharge port for discharging the inserted card. The receipt dispenser 61 has a discharge port for discharging a receipt or the like issued by the printer 60 stored in the storage unit 14.

The self-service checkout POS terminal 1 includes a human detection sensor 42 (see FIG. 3), a card sensor 52 (see FIG. 3), a card LED 53, a receipt sensor 62 (see FIG. 3), and a receipt LED 63.

The scanner 40 reads a bar code or a code symbol such as a two-dimensional code placed over the reading window 41. For example, the scanner 40 reads a commodity code with which a commodity can be identified, a customer code with which a customer attached to a membership card that is given to a member who has registered as a member can be identified, and the like.

Figure 3:
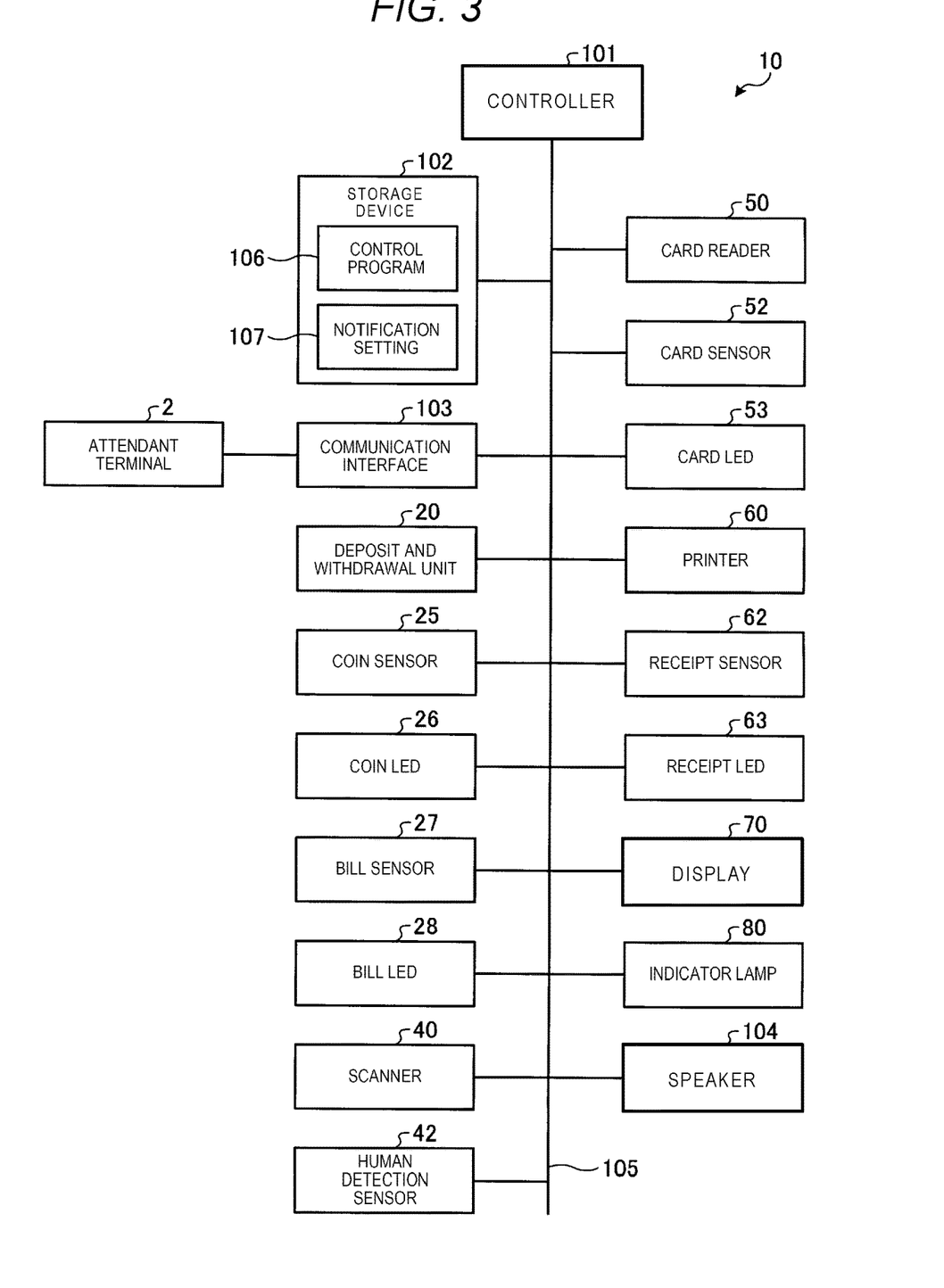
FIG. 3 is a block diagram illustrating a hardware configuration of the self-service checkout POS terminal.

The human detection sensor 42 is a sensor for detecting a human body in front of the self-service checkout POS terminal 1. For example, the human detection sensor 42 is an infrared sensor that emits infrared rays and detects a human body by the reflected infrared rays. The human detection sensor 42 may be a sensor for detecting body temperature or a sensor for detecting a human body in another form. The human detection sensor 42 is directed to the front of the reading window 41 via the reading window 41. Accordingly, the human detection sensor 42 detects a human body at a predetermined position such as the front of the self-service checkout POS terminal 1.

Then, when a human body is detected by the human detection sensor 42, the scanner 40 reads the code symbol. That is, when a human body is detected by the human detection sensor 42, the scanner 40 lights the illumination and illuminates a reading region of the code symbol or irradiates a laser beam or the like for reading the code symbol.

The card reader 50 is a reading device that reads a card such as a credit card inserted into the insertion port of the card dispenser 51. The card sensor 52 is a sensor for detecting a card in the card dispenser 51. For example, the card sensor 52 is a photo-sensor that detects a card according to whether or not light is received without being interrupted by the card in the card dispenser 51. The card LED 53 is an LED that flickers when a card is present in the card dispenser 51.

The printer 60 is a printing device that prints receipts illustrating details of one transaction and a coupon such as a commodity discount on receipt paper or the like. The receipt sensor 62 is a sensor for detecting a receipt in the discharge port of the receipt dispenser 61. For example, the receipt sensor 62 is a photo-sensor that detects a receipt according to whether or not light is received without being interrupted by a receipt in the discharge port of the receipt dispenser 61. The receipt LED 63 is an LED which flickers when a receipt is present in the discharge port of the receipt dispenser 61.

The display 70 is, for example, a liquid crystal display device in which a touch panel is laminated.

The indicator lamp 80 is an electric lamp for notifying a store clerk of occurrence of an abnormality or the like in the self-service checkout POS terminal 1.

Next, the hardware configuration of the self-service checkout POS terminal 1 will be described.

FIG. 3 is a block diagram illustrating an example of the hardware configuration of the self-service checkout POS terminal 1. The self-service checkout POS terminal 1 includes a controller 101, a storage device 102, a communication interface 103, the deposit and withdraw unit 20, the coin sensor 25, the coin LED 26, the bill sensor 27, the bill LED 28, the scanner 40, the human detection sensor 42, the card reader 50, the card sensor 52, the card LED 53, the printer 60, the receipt sensor 62, the receipt LED 63, the display 70, the indicator lamp 80, and a speaker 104. These respective elements are connected with one another via a system bus 105 such as a data bus, an address bus, or the like.

The controller 101 controls the overall operation of the self-service checkout POS terminal 1 and performs various functions of the self-service checkout POS terminal 1. The controller 101 includes a central processing unit (CPU), a read only memory (ROM), and a random access memory (RAM). The CPU comprehensively controls the operation of the self-service checkout POS terminal 1. The ROM is a storage medium that stores various programs and various data. The RAM is a storage medium that temporarily stores various programs and various data. Then, the CPU executes a program stored in the ROM or the storage device 102 or the like with the RAM as a work area.

The storage device 102 is a storage device such as a hard disk drive (HDD) or a solid state drive (SSD). The storage device 102 stores a control program 106 and a notification setting 107.

The control program 106 is a program for causing functions provided in the operating system or the self-service checkout POS terminal 1 to be exhibited. The control program 106 includes a program for exhibiting the characteristic functions according to the embodiment.

Figure 4:
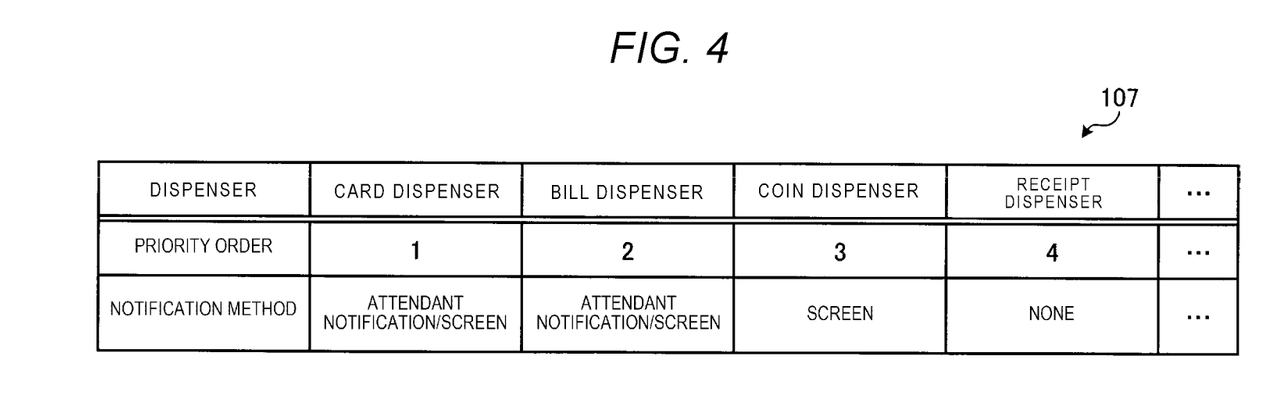
FIG. 4 is a diagram illustrating an example of a data configuration of a notification setting.

Here, FIG. 4 is a diagram illustrating an example of a data configuration of the notification setting 107. The notification setting 107 is a setting of the notification method of an article that is not collected from the self-service checkout POS terminal 1. In the notification setting 107, priority order and the notification method are stored in association with respective dispensers of the forgotten articles. The "dispenser" field indicates the name of the dispenser in which the corresponding article was left behind. That is, the field may indicate the card dispenser 51, the bill dispenser 24, the coin dispenser 22, the receipt dispenser 61, and the like. The "priority order" field indicates the priority order of notification of the article that was left behind in the dispenser. The priority order illustrated in FIG. 4 indicates that the smaller the numerical value, the higher the priority. The "notification method" field indicates a notification method of the article that was left behind in the dispenser. In the notification method illustrated in FIG. 4, in the case of the "card dispenser" and the "bill dispenser", it is indicated that notification is made by both an attendant terminal 2 and the display 70 of the self-service checkout POS terminal 1. In the case of the "coin dispenser", it is indicated that notification is made by the display 70. In the case of "receipt dispenser", it is indicated that notification is not made.

The communication interface 103 executes communication with a device connected via a network. For example, the communication interface 103 executes communication with the attendant terminal 2 connected via a network. The attendant terminal 2 is an information processing device that displays states of the plurality of self-service checkout POS terminals 1 associated in advance.

The speaker 104 is a speaker that outputs a sound such as a warning sound and a voice message.

Figure 5:
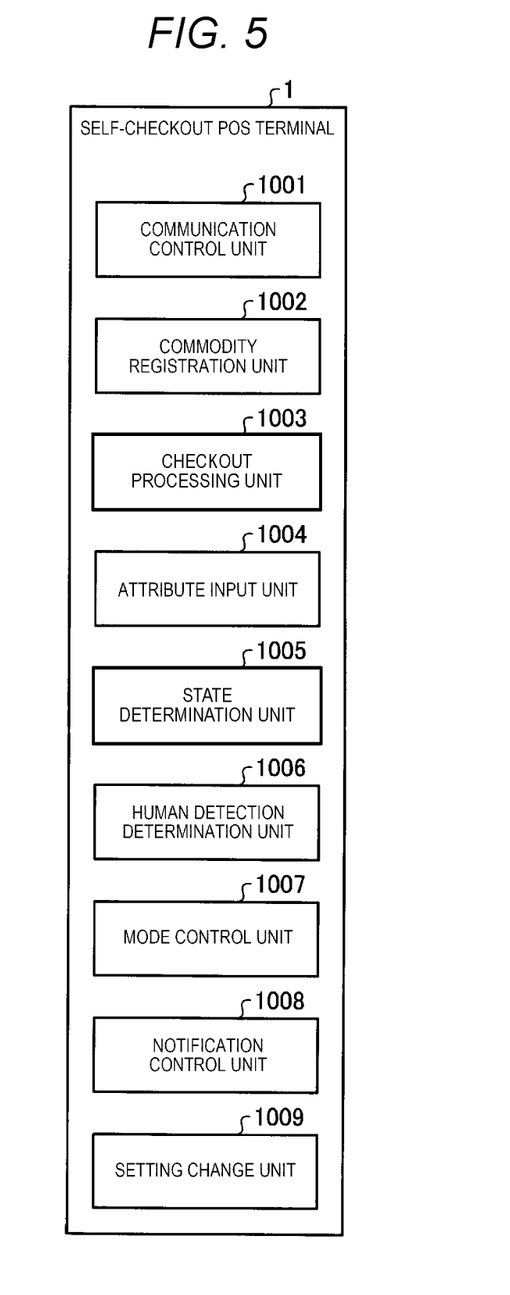
FIG. 5 is a block diagram illustrating a functional configuration of the self-service checkout POS terminal.

Next, the functions provided in the self-service checkout POS terminal 1 will be described. Here, FIG. 5 is a block diagram illustrating an example of a functional configuration provided in the self-service checkout POS terminal 1. The controller 101 of the self-service checkout POS terminal 1 loads the control program 106 of the storage device 102 in the RAM, and operates in accordance with the control program 106, thereby generating respective functional units illustrated in FIG. 5 on the RAM. Specifically, the controller 101 of the self-service checkout POS terminal 1 includes, as functional units, a communication control unit 1001, a commodity registration unit 1002, an checkout processing unit 1003, an attribute input unit 1004, an article state determination unit 1005, a human detection determination unit 1006, a mode control unit 1007, a notification control unit 1008, and a setting change unit 1009.

The communication control unit 1001 controls the communication interface 103 to control communication with a device connected to the network. For example, the communication control unit 1001 controls communication with the attendant terminal 2.

The commodity registration unit 1002 controls commodity registration processing for registering the commodity to be sold. In a case where the operator is at a predetermined position, the commodity registration unit 1002 causes the scanner 40 to execute reading processing for reading the code symbol. More specifically, the commodity registration unit 1002 illuminates the reading area of the code symbol with lighting and the like of the scanner 40. The commodity registration unit 1002 causes the scanner 40 to emit a laser beam or the like for reading the code symbol. Then, the commodity registration unit 1002 receives input of the commodity code that can identify the commodity by reading the code symbol attached to the commodity placed over the reading window 41. The commodity registration unit 1002 registers a commodity specified by the input commodity code.

The checkout processing unit 1003 controls checkout processing of the commodity sold and registered by the commodity registration unit 1002. For example, the checkout processing unit 1003 calculates the total price of commodities sold and registered by the commodity registration unit 1002. The checkout processing unit 1003 calculates change by subtracting the total price from an amount received from the customer.

The attribute input unit 1004 receives input of attribute information indicating an attribute of a customer who operates the self-service checkout POS terminal 1. The attribute of the customer is, for example, age, gender, language used, and the like. For example, the attribute input unit 1004 receives input of attribute information as the scanner 40 reads the customer card. The method of inputting the attribute information is not limited to reading of the customer card, but may be input by operation, or may be input by short-range wireless communication or the like.

The article state determination unit 1005 determines, for each dispenser, whether or not an article, such as a credit card, a bill, a coin, or a receipt, was left behind in the dispenser. More specifically, based on a signal output from the coin sensor 25, the article state determination unit 1005 determines whether or not the coin was left behind in the coin dispenser 22. Based on a signal output from the bill sensor 27, the article state determination unit 1005 determines whether or not the bill was left behind in the bill dispenser 24. Based on the signal output from the card sensor 52, the article state determination unit 1005 determines whether or not a card such as a credit card or the like was left behind in the card dispenser 51. Based on a signal output from the receipt sensor 62, the article state determination unit 1005 determines whether or not the receipt was left behind in the receipt dispenser 61.

The human detection determination unit 1006 determines whether or not the operator such as a customer who operates the self-service checkout POS terminal 1 is at a predetermined position. That is, the human detection determination unit 1006 determines whether or not the human body such as the customer is in front of the self-service checkout POS terminal 1. Based on a signal output from the human detection sensor 42, the human detection determination unit 1006 determines whether or not the human body is at the predetermined position.

The mode control unit 1007 controls a mode of the scanner 40. The mode of the scanner 40 includes a commodity registration mode and a human body detection mode.

The commodity registration mode is a mode which is set at the time of commodity registration processing. In the case of the commodity registration mode, the commodity registration unit 1002 causes the scanner 40 to execute reading processing of the code symbol on the condition that the human detection determination unit 1006 determines that a human body is present. The reading processing is, for example, processing for lighting on illumination that illuminates the reading area of the scanner 40 or emitting laser light for reading the code symbol.

The human body detection mode is a mode set at the time of the checkout processing. The commodity registration unit 1002 does not cause the scanner 40 to execute code symbol reading processing even if it is determined, by the human detection determination unit 1006, that a human body is present on the condition that the human body detection mode is set. That is, the scanner 40 does not light on illumination that illuminates the reading area, and does not emit the laser beam for reading the code symbol.

The notification control unit 1008 notifies that the article was left behind in the dispenser. The notification control unit 1008 notifies by a different notification method between in a case where a human body is detected and in a case where the human body is not detected. The notification control unit 1008 does not give notification in a case where the article state determination unit 1005 determines that the article was not left behind in the dispenser.

In a case where the article state determination unit 1005 determines that the article discharged by the dispenser was left behind in the dispenser, the notification control unit 1008 notifies that the commodity was left behind in the dispenser by the first notification method. The first notification method is to cause an LED associated with the dispenser which has discharged the commodity to flicker. More specifically, the notification control unit 1008 causes the coin LED 26 to flicker in a case where it is determined that the coin was left behind in the coin dispenser 22. The notification control unit 1008 causes the bill LED 28 to flicker in a case where it is determined that the bill was left behind in the bill dispenser 24. The notification control unit 1008 causes the card LED 53 to flicker in a case where it is determined that the card was left behind in the card dispenser 51. The notification control unit 1008 causes the card LED 53 to flicker in a case where it is determined that the receipt was left behind in the receipt dispenser 61. Accordingly, in a case where the article state determination unit 1005 determines that the articles were left behind in the plurality of dispensers, the notification control unit 1008 causes each of the LEDs associated with the dispenser that has discharged each of the forgotten articles to flicker.

In a case where the article state determination unit 1005 determines that the article was left behind in the dispenser and the human detection determination unit 1006 no longer detects a human body, the notification control unit 1008 determines whether or not a predetermined time has elapsed since the human body is no longer detected. The notification control unit 1008 notifies by the first notification method until a predetermined time has elapsed. The predetermined time is, for example, approximately one second. The predetermined time is not limited to one second, but may be any time.

Here, although the customer is not leaving from the self-service checkout POS terminal 1, the human detection determination unit 1006 may not temporarily detect the human body of the customer, due to the customer's acts such as squatting and changing the position. However, since the customer has not yet left the self-service checkout POS terminal 1, the notification control unit 1008 does not need to change the notification method. Accordingly, the notification control unit 1008 does not change the notification method until a predetermined time elapses since the human body is no longer detected.

In a case where the article state determination unit 1005 determines that the article was left behind in the dispenser and the predetermined time has elapsed since the human detection determination unit 1006 no longer detects the human body, the notification control unit 1008 notifies by the second notification method based on the notification setting 107. The second notification method is, for example, the notification method which is set in the notification setting 107. For example, the notification control unit 1008 notifies by displaying on the display 70 that the commodity was left behind in the dispenser. The notification control unit 1008 notifies by transmitting information indicating that the commodity was left behind in the dispenser to the attendant terminal 2. In a case where the attendant terminal 2 receives information indicating that the article was left behind in the dispenser, the attendant terminal 2 notifies by displaying a type of forgotten article and information capable of identifying the self-service checkout POS terminal 1 in association with each other. The notification control unit 1008 notifies by causing the speaker 104 to output a voice message indicating that the article was left behind in the dispenser. In addition, the notification control unit 1008 notifies that the article was left behind in the dispenser by causing the indicator lamp 80 to flicker.

The notification control unit 1008 does not execute notification by the second notification method with respect to the dispenser for which it is set not to notify the notification setting 107 even if it is determined by the article state determination unit 1005 that an article was left behind in the dispenser. In this case, the notification control unit 1008 executes notification by the first notification method. That is, the notification control unit 1008 causes the LED associated with the corresponding dispenser to flicker.

In a case where notification is performed by the second notification method which is set in the notification setting 107, the notification control unit 1008 determines whether the article was left behind in the dispenser, based on the priority order which is set in the notification setting 107. For example, the notification control unit 1008 sequentially notifies in the order of the priority order which are set in the notification setting 107. More specifically, the notification control unit 1008 notifies that the article was left behind in the dispenser of the next priority order, on the condition that the article state determination unit 1005 determines that the dispenser has run out of the article from the dispenser with the highest priority order.

For example, a case where cards, coins, and receipts were left behind in the respective dispensers will be described as an example of processing for sequentially notifying in the order of priority order. In the notification setting 107 illustrated in FIG. 4, the priority order is high in the order of the card dispenser 51, the coin dispenser 22, and the receipt dispenser 61. In addition, it is set that the card dispenser 51 and the coin dispenser 22 are to be notified by a screen. The receipt dispenser 61 is set not to notify. In this case, the notification control unit 1008 notifies by displaying on the display 70 that the card was left behind in the card dispenser 51. The notification control unit 1008 notifies the display 70 that the coin was left behind in the coin dispenser 22 on the condition that the card cannot be detected from the card dispenser 51. In a case where the coin dispenser 22 can no longer detect coins, the notification control unit 1008 ends notification by the display 70 since it is set not to notify the receipt dispenser 61. Then, the notification control unit 1008 notifies that the receipt was left behind in the dispenser by the first notification method.

Furthermore, in a case where the attribute input unit 1004 is receiving input of the attribute information indicating the attribute of the customer who operates the self-service checkout POS terminal 1, the notification control unit 1008 notifies by the second notification method in accordance with input attribute information. For example, in a case where the second notification method is a voice message and an elderly person indicated by the attribute information is indicated by the second notification method, the notification control unit 1008 notifies the user with a larger sound than a case where the customer is not an elderly person. In a case where the second notification method is a screen display and indicates an elderly person indicated by the attribute information, the notification control unit 1008 notifies by the screen using a larger font size than a case where the customer is not an elderly person. In a case where the second notification method is the screen display and nationality of the customer indicated by the attribute information is foreign nationality, the notification control unit 1008 notifies in foreign languages such as English. Also, how to change the second notification method according to the attribute information may be stored in the notification setting 107 or may be included in the attribute information.

In a case where an input to change the notification setting 107 is received, the setting change unit 1009 changes the notification setting 107 to a setting according to the input content. The method of inputting setting change is not limited. For example, the setting change may be input via the communication interface 103, or may be input via the display 70.

Figure 6:
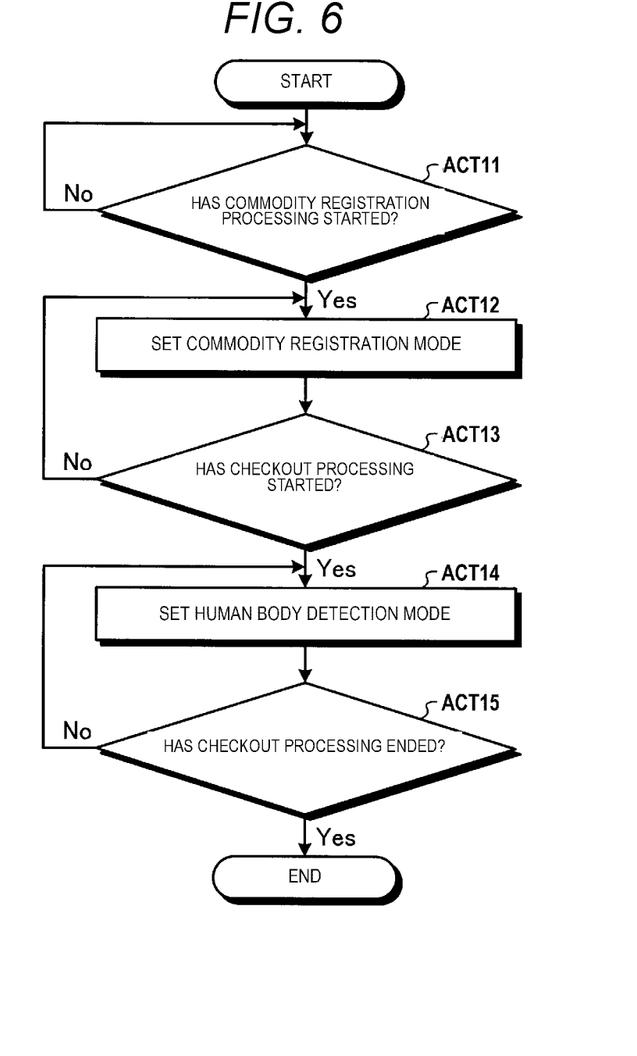
FIG. 6 is a flowchart illustrating mode change processing executed by the self-service checkout POS terminal according to the embodiment.

Next, mode change processing executed by the self-service checkout POS terminal 1 will be described. Here, FIG. 6 is a flowchart illustrating an example of the mode change processing executed by the self-service checkout POS terminal 1 of the embodiment.

The mode control unit 1007 determines whether or not the commodity registration processing has started (Act 11). On the condition that the commodity registration process has not started (No in Act 11), the mode control unit 1007 waits.

On the condition that the commodity registration processing has started (Yes in Act 11), the mode control unit 1007 sets the commodity registration mode (Act 12).

The mode control unit 1007 determines whether or not the checkout processing has started (Act 13). On the condition that the checkout processing has not started (No in Act 13), the mode control unit 1007 proceeds to Act 12 and maintains the commodity registration mode.

On the condition that the checkout processing has started (Yes in Act 13), the mode control unit 1007 sets the human body detection mode (Act 14).

The mode control unit 1007 determines whether or not the checkout processing has ended (Act 15). On the condition that the checkout processing has not completed (No in Act 15), the mode control unit 1007 proceeds to Act 14 and maintains the human body detection mode.

On the condition that the checkout processing has ended (No in Act 15), the mode control unit 1007 ends the mode change processing.

Figure 7:
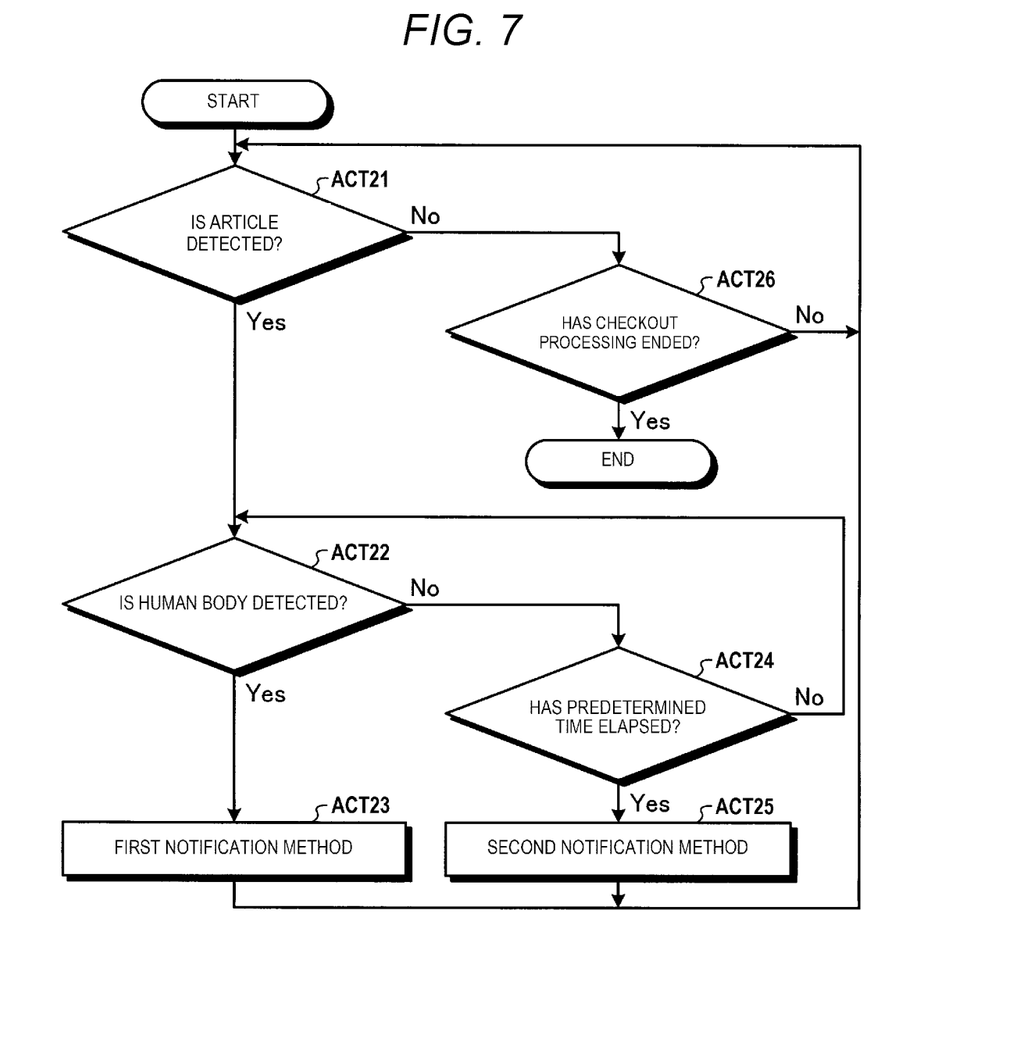
FIG. 7 is a flowchart illustrating notification processing executed by the self-service checkout POS terminal according to the embodiment.

Next, notification processing executed by the self-service checkout POS terminal 1 will be described. Here, FIG. 7 is a flowchart illustrating an example of notification processing executed by the self-service checkout POS terminal 1 of the embodiment. Here, the notification processing is processing for notifying that the article was left behind in the dispenser in the checkout processing.

The article state determination unit 1005 determines whether or not an article was left behind in the dispenser (Act 21). On the condition that the article was left behind in the dispenser (Yes in Act 21), the human detection determination unit 1006 determines whether or not a human body is detected (Act 22).

On the condition that the human body is detected (Yes in Act 22), the notification control unit 1008 notifies the article was left behind in the dispenser by the first notification method (Act 23). Then, the notification control unit 1008 proceeds to Act 21.

On the condition that the human body is not detected in Act 22 (No in Act 22), the notification control unit 1008 determines whether or not a predetermined time has elapsed since the article was left behind and the human body was not detected (Act 24). On the condition that the predetermined time has not elapsed (No in Act 24), the notification control unit 1008 proceeds to Act 22.

On the condition that the predetermined time has elapsed (Yes in Act 24), the notification control unit 1008 notifies the notification by the second notification method based on the notification settings 107 (Act 25). Then, the notification control unit 1008 proceeds to Act 21.

On condition that the forgotten article is not detected (No in Act 21), the checkout processing unit 1003 determines whether or not the checkout processing has ended (Act 26).

On the condition that the checkout processing has not ended (No in Act 26), the checkout processing unit 1003 proceeds to Act 21.

On the condition that the checkout process has ended (Yes in Act 26), the checkout processing unit 1003 ends the notification processing.

As described above, in a case where it is determined that the article discharged from the dispenser was left behind in the dispenser and determines that the operator such as the customer is not at the predetermined position, the self-service checkout POS terminal 1 according to the embodiment notifies by the second notification method which is set in the notification settings 107. Furthermore, in a case where it is determined that a plurality of articles were left behind in the plurality of dispensers, the self-service checkout POS terminal 1 notifies with the priority order which is set in the notification settings 107. Accordingly, the self-service checkout POS terminal 1 can give notification according to importance of the forgotten article in a case of forgetting to collect the plurality of articles.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

In the embodiment described above, the case where matters set forth in the invention are applied to the self-service checkout POS terminal 1 as a checkout device has been described as an example. However, the checkout device can also be applied to a semi-self-service checkout POS terminal which executes the checkout processing of the commodity to be sold by the operation of the customer.

In the embodiment described above, it has been described that the notification control unit 1008 sequentially notifies that the articles were left behind in the dispensers in the order of the priority order of the dispensers which are set in the notification setting 107. However, the notification control unit 1008 may give notification by emphasizing in the order of priority order. The notification control unit 1008 may give notification in a row in the order of the priority order of the dispensers.

In the embodiment described above, it has been described that the notification setting 107 stores the priority order and the notification method for each dispenser such as the card dispenser 51, the bill dispenser 24, the coin dispenser 22, and the receipt dispenser 61. However, the notification settings 107 may store the priority order and the notification method for each commodity to be discharged by the dispenser. For example, the receipt dispenser 61 may discharge not only the receipt indicating details of one transaction but also the coupon for discounting the commodity. Then, in a case where the importance differs between the receipt and the coupon, the notification settings 107 may store different priority orders and receipt methods for receipts and coupons.

The program to be executed by each device of the embodiment described and a modification example are assumed to be provided by being incorporated in advance in a storage medium (i.e., ROM or storage unit) provided in each device, but the invention is not limited thereto. For example, a configuration in which the program is provided by being recorded in a computer readable recording medium such as a CD-ROM, a flexible disk (FD), a CD-R, a digital versatile disk (DVD) in a file in an installable format or an executable format may be available. Furthermore, the storage medium is not limited to a medium independent of a computer or an embedded system, but includes a storage medium in which a program transmitted by a LAN, the Internet, or the like is downloaded and stored or temporarily stored.

A configuration in which the program executed by each device of the embodiment and the modification example is stored on a computer connected to a network such as the Internet and provided by being downloaded via the network may be available, or a configuration in which the program executed by each device of the embodiment and the modification example is be provided or distributed via a network may be available.

What is claimed is:

1. A self-service checkout apparatus comprising:
a plurality of dispensers each configured to dispense an article that is one of a card, a coin, and a receipt;
a memory that stores information indicating a notification order to be used when providing multiple notifications to a user, the multiple notifications including one notification that the user left behind one of the card, the coin, and the receipt in the corresponding dispenser and another notification that the user left behind a different one of the card, the coin, and the receipt in the corresponding dispenser;
a plurality of first sensors each configured to detect a presence of the article in the corresponding dispenser;
a plurality of first indicators each configured to indicate that the presence of the article in the corresponding dispenser;
a second indicator configured to indicate that one of the card, the coin, and the receipt was left behind in the corresponding dispenser;
a second sensor configured to detect whether the user is present at the self-service checkout apparatus; and
a processor configured to
when one or more articles are detected by the first sensors and the user is detected by the second sensor, perform a first notification using the respective one or more of the first indicators, and
when one or more articles are detected by the first sensors and the user is not detected by the second sensor, perform a second notification using at least one of the second indicator and a third indicator of another apparatus, wherein
when the second notification includes two or more notifications as a result of the user leaving behind two or more of the card, the coin, and the receipt in the corresponding dispensers, the notifications are provided according to the notification order.

2. The apparatus according to claim 1, wherein
each of the first indicators is an LED, and
the first notification is performed by turning on the LED.

3. The apparatus according to claim 1, wherein
the second indicator is a display of the self-service checkout apparatus, and
the second notification is performed by displaying a screen indicating that one of the card, the coin, and the receipt was left behind in the corresponding dispenser.

4. The apparatus according to claim 1, wherein
the second indicator is a speaker, and
the second notification is performed by playing a message indicating that one of the card, the coin, and the receipt was left behind in the corresponding dispenser.

5. The apparatus according to claim 1, wherein
the third indicator is a display of the other apparatus connected to the self-service checkout apparatus through a network, and
the second notification is performed by displaying on the display a screen indicating that one of the card, the coin, and the receipt was left behind in the corresponding dispenser.

6. The apparatus according to claim 1, further comprising:
an input device configured to receive input of attribute information indicating an attribute of the user,
wherein the second notification varies depending on the input attribute.

7. The apparatus according to claim 6, wherein
the attribute includes at least one of age, gender, and language.

8. The apparatus according to claim 1, further comprising:
a scanner configured to read a code symbol,
wherein the processor controls the scanner to read the code symbol when the user is present at a predetermined position.

9. The apparatus according to claim 1, wherein
when the first notification for one of the articles by the corresponding first indicator is disabled, the second notification is not performed even when the one of the articles is detected by the corresponding first sensor and the user is not detected by the second sensor.

10. The apparatus according to claim 1, wherein
the second notification is performed when the articles are detected in the respective dispensers and a predetermined time period has passed after the second sensor detects that the user is not present.

11. A method carried out by a self-service checkout apparatus including a plurality of dispensers each configured to dispense an article that is one of a card, a coin, and a receipt, the method comprising:
storing information indicating a notification order to be used when providing multiple notifications to a user, the multiple notifications including one notification that the user left behind one of the card, the coin, and the receipt in the corresponding dispenser and another notification that the user left behind a different one of the card, the coin, and the receipt in the corresponding dispenser;
dispensing a plurality of articles including the card, the coin, and the receipt, from the respective dispensers;
detecting a presence of each article in the corresponding dispenser;
detecting whether a user is present at the self-service checkout apparatus;
when one or more articles are detected in the respective dispensers and the user is detected at the self-service checkout apparatus, performing a first notification using respective one or more of the first indicators of the self-service checkout apparatus; and
when one or more articles are detected in the respective dispensers and the user is not detected at the self-service checkout apparatus, performing a second notification using at least one of a second indicator of the self-service checkout apparatus and a third indicator of another apparatus, wherein
when the second notification includes two or more notifications as a result of the user leaving behind two or more of the card, the coin, and the receipt in the corresponding dispensers, the notifications are provided according to the notification order.

12. The method according to claim 11, wherein
each of the first indicators is an LED, and
the first notification is performed by turning on the LED.

13. The method according to claim 11, wherein
the second indicator is a display of the self-service checkout apparatus, and the second notification is performed by displaying on the display a screen indicating that one of the card, the coin, and the receipt was left behind in the corresponding dispenser.

14. The method according to claim 11, wherein
the second indicator is a speaker, and
the second notification is performed by playing a message indicating that one of the card, the coin, and the receipt was left behind in the corresponding dispenser.

15. The method according to claim 11, wherein
the third indicator is a display of the other apparatus connected to the self-service checkout apparatus through a network, and
the second notification is performed by displaying on the display a screen indicating that one of the card, the coin, and the receipt was left behind in the corresponding dispenser.

16. The method according to claim 11, further comprising:
receiving input of attribute information indicating an attribute of the user,
wherein the second notification varies depending on the input attribute.

17. The method according to claim 16, wherein
the attribute includes at least one of age, gender, and language.

18. The method according to claim 11, further comprising:
reading a code symbol by a scanner when the user is present at a predetermined position.

19. The method according to claim 11, wherein
when the first notification for one of the articles by the corresponding first indicator is disabled, the second notification is not performed even when the one of the articles is detected in the corresponding dispenser and the user is not detected at the self-service checkout apparatus.

20. The method according to claim 11, wherein
the second notification is performed when the articles are detected in the respective dispensers and a predetermined time period has passed after the user's absence is detected.

* * * * *